United States Patent [19]
Redford

[11] Patent Number: 6,049,330
[45] Date of Patent: Apr. 11, 2000

[54] METHOD AND APPARATUS FOR OPTIMIZING STORAGE OF COMPRESSED IMAGES IN MEMORY

[75] Inventor: John Redford, Cambridge, Mass.

[73] Assignee: Oak Technology, Inc., Sunnyvale, Calif.

[21] Appl. No.: 08/919,699

[22] Filed: Aug. 28, 1997

[51] Int. Cl.[7] .................................................. G09G 5/00
[52] U.S. Cl. .......................... 345/202; 345/203; 358/404; 382/305
[58] Field of Search ..................................... 345/501–506, 345/521, 507, 202, 203; 358/514, 530, 539, 403, 404, 426, 432, 433, 442, 444, 448, 449, 467; 382/162, 166, 190–194, 232, 233, 235, 305, 244–253; 395/101, 114–117

[56] References Cited

U.S. PATENT DOCUMENTS

| | | | |
|---|---|---|---|
| 5,321,522 | 6/1994 | Eschbach | 358/433 |
| 5,379,122 | 1/1995 | Eschbach | 358/426 |
| 5,485,205 | 1/1996 | Miyata | 348/248 |
| 5,521,718 | 5/1996 | Eschbach | 358/432 |
| 5,602,976 | 2/1997 | Cooper et al. | 395/116 |
| 5,638,498 | 6/1997 | Tyler et al. | 395/117 |
| 5,699,457 | 12/1997 | Adar et al. | 382/239 |
| 5,761,345 | 6/1998 | Saito et al. | 382/246 |

FOREIGN PATENT DOCUMENTS

| | | |
|---|---|---|
| 0 469 835 A2 | 2/1992 | European Pat. Off. . |
| 0 528 365 | 2/1993 | European Pat. Off. . |
| 0 584 991 A2 | 3/1994 | European Pat. Off. . |
| 0 633 688 | 1/1995 | European Pat. Off. . |
| 0 740 457 | 10/1996 | European Pat. Off. . |
| 0 802 682 A1 | 10/1997 | European Pat. Off. . |
| 02231881 | 9/1990 | Japan . |
| WO 89/08962 | 9/1989 | WIPO . |
| WO 95/02938 | 1/1995 | WIPO . |

OTHER PUBLICATIONS

Patent Cooperation Treaty, International Search Report, International Application No. PCT/US 99/11344, mailed on Aug. 11, 1999, 5 pages.

*Primary Examiner*—Ulka J. Chauhan
*Attorney, Agent, or Firm*—Testa, Hurwitz & Thibeault, LLP

[57] ABSTRACT

A method and apparatus for optimizing the storage of compressed images includes serially storing pixel block data in memory. Fixed memory utilization can be improved for images having pixel blocks of varying information content. A cumulative memory allocation is updated during processing of each pixel block and compared with the current memory requirement. Memory not utilized for earlier processed pixel blocks having low information content can be used to store later processed high information content pixel blocks.

9 Claims, 3 Drawing Sheets

METHOD AND APPARATUS FOR OPTIMIZING STORAGE OF COMPRESSED IMAGES IN MEMORY

FIELD OF THE INVENTION

The invention relates generally to an image processing system and method for image data compression. In particular, the invention relates to an image processing system with improved utilization of available memory for storing compressed images.

BACKGROUND OF THE INVENTION

Image compression techniques reduce the memory required for storage of large or complex images, permitting storage of images in devices with limited memory. For example, image compression techniques used in digital copiers and scanners assist in storage of complex images for subsequent printing. Similarly, image compression benefits communication links where bandwidth limitations would otherwise render transmission of image data impractical. Image compression also offers substantial benefits for archiving large image libraries.

JPEG (Joint Photographic Experts Group) is a standardized image compression technique that can be used with either full-color or gray-scale images. This technique performs a Discrete Cosine Transform (DCT) on each block of pixels in an image. The result of the DCT for each block of pixels is an array of frequency components. Low frequency components correspond to slowly varying intensities between neighboring pixels. High frequency components represent rapidly varying intensities across small clusters of pixels. Information represented by the higher frequency components is reduced by quantization, i.e., the restriction of actual values to a limited set of values. The compressed image size is related to the quantization level specified by the user. The frequency components are encoded in order from the lowest frequency to the highest. If there are no frequency components beyond a specific frequency, then no further data from that block is encoded. Instead, an end of block symbol is emitted to indicate to a decoder that the block is complete.

Application of the above technique to blocks of pixels having high spatial frequencies may result in data represented by more bits than can be stored in a memory device or transmitted over a communication link in a limited time. One technique used to overcome this problem is to count the total number of bits used to represent the block of pixels and compare the total with a maximum allowable value. If the total exceeds the maximum value, the highest non-zero frequency component is decreased in absolute value and the total number of bits is recalculated and compared with the maximum. This process is repeated until the total number of bits is no greater than the maximum value. Generally, human perception of images is more affected by amplitude changes in the lower frequency components than higher frequency components, therefore this technique typically has negligible impact on perceived image quality. However, an image stored under the JPEG standard and subsequently recalled is reduced in quality from the original image. Multiple applications of JPEG compression on an image can result in a significant reduction in the image quality. It is therefore desirable to store as many of the higher frequency components as possible in the available memory.

One known storage technique for JPEG compressed images, described in U.S. Pat. No. 5,321,522, provides fixed memory allocation for each block of pixels. Therefore, a block of pixels that has no high frequency components may not require all the bits available in a block of memory. As a result, there can be "gaps" in memory. Subsequent processing, however, may include blocks of pixels with high frequency information that exceeds the available memory allocated to individual blocks, thereby requiring the loss of some information.

SUMMARY OF THE INVENTION

A method for optimizing the storage of compressed images has been developed which is useful for a wide variety of applications, including, but not limited to, storage of digital images in limited memory devices.

The method requires the image to be compressed be divided into a series of smaller images or pixel blocks. The values corresponding to the pixel blocks are then processed, one block at a time, by a processor module. Processing can include performing a transform function on each pixel block. The transform function can be one that generates frequency space coefficients representative of the pixel block data (e.g., a discrete cosine transform (DCT)). Processing can include further operations such as ordering the frequency space coefficients, recalling quantization values from memory and creating quantized frequency space coefficients by dividing the frequency space coefficients by the corresponding quantization values. Additional processing can be used to create a data packet for each quantized frequency space coefficient and to encode each data packet (i.e., a symbol or sequence of bits).

A cumulative memory allocation, which defines the current allowable memory, is determined each time a new pixel block is processed. The cumulative memory allocation can be based on the number of pixel blocks currently processed and an average memory allocation for each pixel block. The processor module generates a series of data packets for each processed pixel block. The bits contained in each data packet are counted and the result is added to the number of bits previously stored in memory to yield a current memory total. The current memory total is compared to the cumulative memory allocation to determine whether the current data packet should be written to memory. If the current memory total does not exceed the cumulative memory allocation, the current data packet is written to memory. If the current memory total exceeds the cumulative memory allocation, no further data packets for the present pixel block are written to memory and processing begins on the next pixel block.

This method avoids the "memory gaps" that can result from existing methods, such as described in U.S. Pat. No. 5,321,522, which provide a fixed memory allocation for each block of pixels. The present invention is more flexible in its allocation of memory. If earlier processed blocks do not fill the average memory available for each block, later processed blocks containing more information can take advantage of the excess memory for the earlier blocks. In effect, each block of pixel data is packed into memory serially rather than being restricted to a block of memory, thereby permitting more information to be stored for a given image. This method can be implemented as the data packets are generated, thereby avoiding the need to later process each data block.

The invention also features an apparatus for optimally compressing a digital image into a memory module. The apparatus includes a processor module to process pixel blocks and generate data packets. The processor can perform various functions, including transforms (e.g., a DCT), on each pixel block. Processor output can include spatial frequency coefficients for each pixel block which can be quantized and formatted into data packets. The apparatus includes a counter which receives the processor output, determines the number of bits in each data packet and adds the result to generate a current memory total. A comparator compares the current memory total to a reference signal representative of the cumulative memory allocation. The cumulative memory allocation, for example, can be based upon the number of pixel blocks processed for the image and an average memory allocation per pixel block. An output device, such as a buffer, temporarily stores the data packet generated by the processor. The comparator output enables the output device to write the data packet to memory when the current memory total does not exceed the cumulative memory allocation.

DETAILED DESCRIPTION OF THE INVENTION

Figure 1:
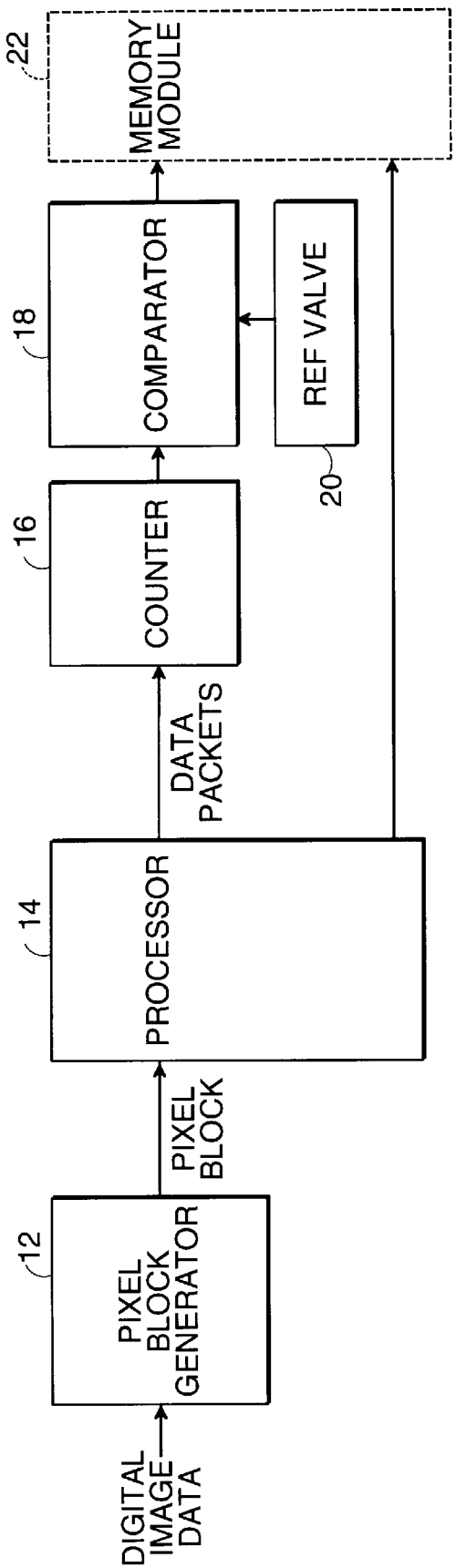
FIG. 1 is a functional block diagram of an apparatus for practicing an optimized method for storage of compressed images.

FIG. 1 shows a functional block diagram of an apparatus for practicing the method incorporating the present invention. A digital image to be compressed is divided into a series of sub-images or pixel block data by a pixel block generator 12 and transferred to a processor 14. The processor 14 performs a transfer function on each pixel block to produce transformed pixels blocks each consisting of a series of data packets.

The number of bits in each data packet is determined by a counter 16 and added to the number of bits for all previously stored data packets, yielding a current memory total. A comparator 18 compares the value generated by the counter 16 with a reference value 20. The reference value 20 represents a cumulative memory allocation for memory 22 usually based upon the number of pixel blocks previously processed for the current image. Typically, the reference value 20 is updated each time a new pixel block is processed. If the comparator 18 determines that the current memory total does not exceed the cumulative memory allocation, the data packet is written to memory 22. If the comparator 18 determines that the current memory total exceeds the cumulative memory allocation, no further data packets for the current pixel block are written to memory and a new pixel block is processed.

Figure 2:
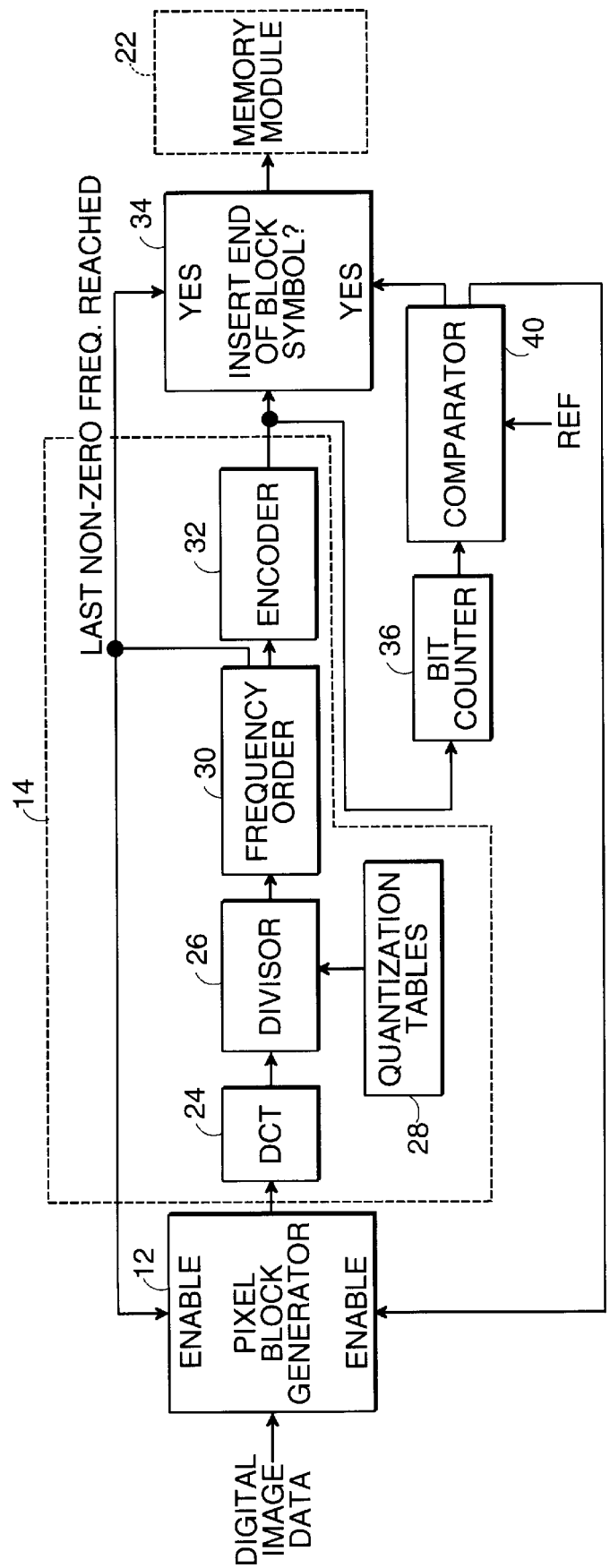
FIG. 2 is a detailed block diagram of an apparatus for practicing an optimized method for storage of images compressed using the JPEG standard.

Referring to FIG. 2, an apparatus for practicing an optimized method for storage of compressed images employing a JPEG compression standard is shown. Digital image data is transferred to a pixel block generator 12 and divided into pixel blocks. The pixel blocks are transferred, one block at a time, to a processor 14. First, the processor 14 performs a discrete cosine transform (DCT) 24 on each pixel block, generating frequency space coefficients. Next, the frequency space coefficients are quantized by a divisor 26 which divides each frequency space coefficient by a corresponding quantization value from a quantization table memory 28. The non-integer portion of the resulting values are discarded and the resulting quantized frequency space coefficients are provided to a frequency orderer 30 to be arranged in substantially increasing frequency order.

Quantized frequency coefficients are encoded at encoder 32 into symbols which are passed to an end of block symbol inserter 34 and a bit counter 36. The bit counter 36 determines the number of bits in the symbol and adds the result to the number of bits already stored in memory 22, yielding a current memory total. The current memory total is compared with a cumulative memory allocation at a comparator 40. If the current memory total does not exceed the cumulative memory allocation, the last created symbol is written to memory 22 and the next symbol from the encoder 32 is examined by bit counter 36. If the current memory total exceeds the cumulative memory allocation, the end of block symbol is written to memory 22 and the pixel block generator 12 provides a new block to the processor 14. If the last non-zero frequency coefficient for the block is detected by the frequency orderer 30, the end of block symbol inserter 34 appends an end of block symbol to the current symbol. Both symbols are then written to memory 22 and the pixel block generator 12 provides a new block to the processor 14.

Figure 3:
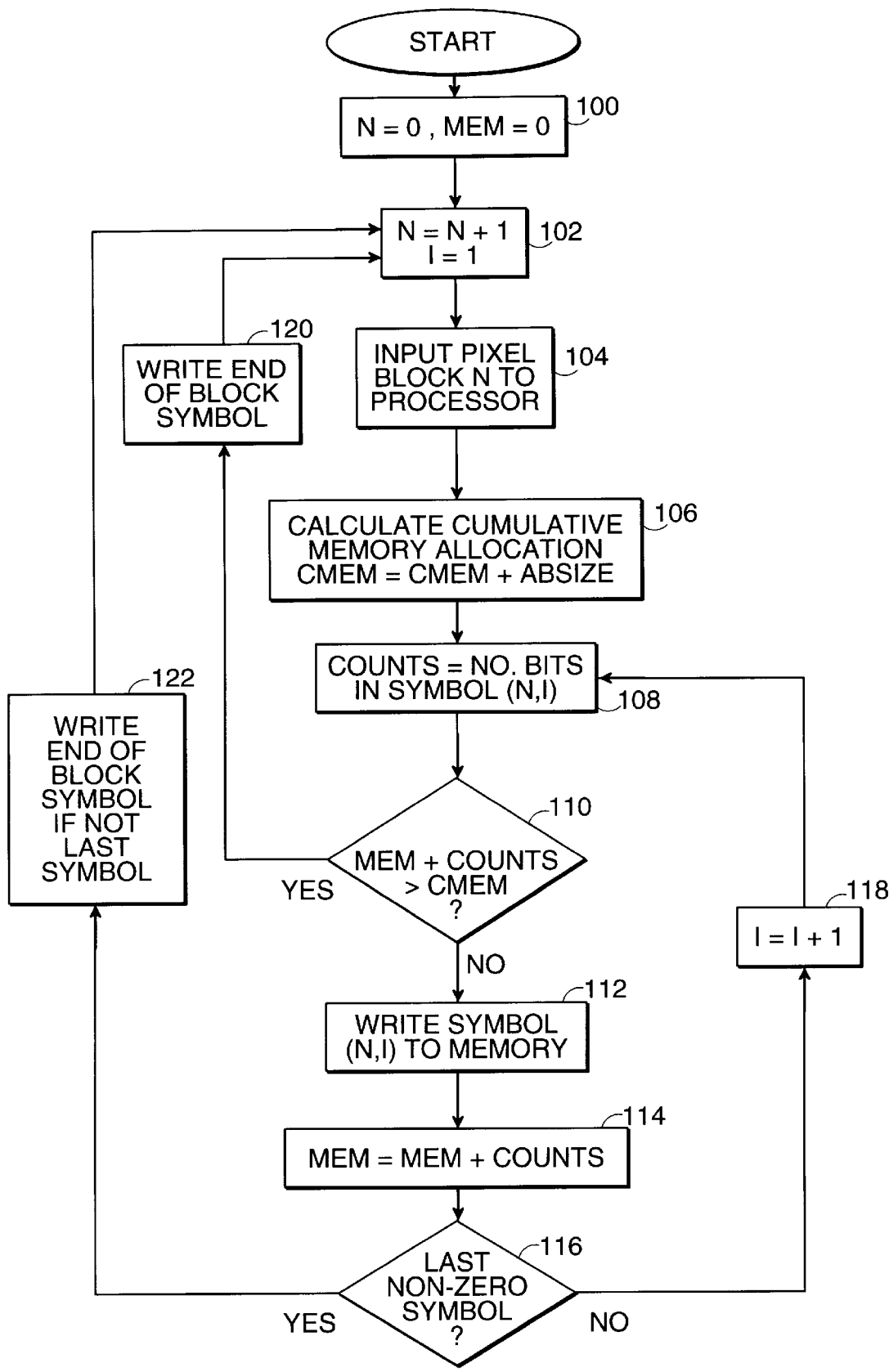
FIG. 3 is a flow chart of the iterative method for compressing a processed image.

Referring to the flow chart in FIG. 3, one implementation of the method of the invention is described as a series of steps. At step 100, pixel block counter, N, and the current memory total, MEM, are set to zero. At step 102, data packet counter, I, is set to one and N is incremented by one to indicate the start of processing of a new pixel block in step 104. Next, the cumulative memory allocation, CMEM, is calculated at step 106. In this example, CMEM is incremented by the average allowable block size, ABSIZE, at the start of each new block. However, CMEM may be determined by other means. At step 108, the number of bits (COUNTS) in the Ith data packet generated by the processor is determined.

In step 110, the current memory requirement, MEM+COUNTS, is compared with CMEM. If the current memory requirement exceeds the cumulative memory allocation, an end of block symbol is written to memory at step 120. N is then incremented by one and I is reset to one at step 102 and the next pixel block is provided to the processor at step 104. If the current memory requirement does not exceed the cumulative memory allocation, the Ith symbol for the Nth pixel block is written to memory in step 112, CMEM is updated in step 114, and a determination as to whether the last non-zero symbol has been processed for the current pixel block is made in step 116. If the symbol written to memory was not the last non-zero symbol for the pixel block, I is incremented by one in step 118 and the procedure returns to step 108 to examine the next generated symbol. If the last non-zero symbol for the pixel block was detected according to step 116, an end of block symbol is written to memory at step 122. N is then incremented by one and I is reset to one at step 102 and the next pixel block is processed at step 104.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of compressing a digital image into a memory module, comprising the steps of:

a) processing a block of pixel values from the digital image in processor module to generate a plurality of data packets;

b) determining a cumulative memory allocation in response to the total number of blocks of pixel values processed for the digital image;

c) counting the bits in a data packet;

d) determining a current memory total based on the number of bits in data packets that have been previously stored in the memory module for the digital image;

e) determining for each data packet whether the sum of the current memory total and the number of counted bits in the data packet exceeds the cumulative memory allocation;

f) writing the data packet to the memory module if the sum of the current memory total and the number of counted bits does not exceed the cumulative memory allocation;

g) updating the current memory total if the data packet was written to memory;

h) repeating steps c) to g) for a subsequent data packet if the current memory total does not exceed the cumulative memory allocation; and i) repeating steps a) to h) for a subsequent block of pixel values from the digital image if the current memory total exceeds the cumulative memory allocation.

2. The method of claim 1 wherein step a) further comprises the step of performing a transform function on each block of pixel values.

3. The method of claim 2 wherein step a) further comprises generating frequency space coefficients representative of the spatial frequencies within each block of pixels.

4. The method of claim 3 wherein the transform is a discrete cosine transform (DCT).

5. The method of claim 3 wherein step a) further comprises the step of arranging the frequency space coefficients in substantially increasing frequency order.

6. The method of claim 5 wherein step a) further comprises the step of recalling from a memory a set of stored quantization values.

7. The method of claim 6 wherein step a) further comprises the step of dividing the frequency space coefficients by the corresponding quantization values, yielding quantized frequency coefficients.

8. The method of claim 7 wherein each data packet corresponds to one of the quantized frequency coefficients.

9. The method of claim 8 further comprising encoding each data packet generated by the processor module prior to performing step c).

* * * * *